(12) United States Patent
Lomenzo et al.

(10) Patent No.: US 10,465,544 B2
(45) Date of Patent: Nov. 5, 2019

(54) EDDY CURRENT DAMPER FOR LIFT OFF SEAL

(71) Applicant: UNITED TECHNOLOGIES CORPORATION, Farmington, CT (US)

(72) Inventors: Richard A. Lomenzo, Enfield, CT (US); Daniel L. Gysling, South Glastonbury, CT (US); Joseph V. Paturzo, Avon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 10 days.

(21) Appl. No.: 15/657,882

(22) Filed: Jul. 24, 2017

(65) Prior Publication Data

US 2019/0024523 A1    Jan. 24, 2019

(51) Int. Cl.
*F01D 11/00* (2006.01)
*F16J 15/34* (2006.01)
*F01D 25/16* (2006.01)

(52) U.S. Cl.
CPC .......... *F01D 11/003* (2013.01); *F01D 11/005* (2013.01); *F01D 25/16* (2013.01); *F16J 15/3444* (2013.01); *F05D 2220/32* (2013.01); *F05D 2240/60* (2013.01)

(58) Field of Classification Search
CPC .. F01D 11/003; F05D 2220/32; F16J 15/3444
USPC ................. 277/367, 370, 371, 390–393, 397
See application file for complete search history.

(56) References Cited

U.S. PATENT DOCUMENTS

| | | | | |
|---|---|---|---|---|
| 3,227,463 A | * | 1/1966 | Wiese | F16J 15/3468 277/408 |
| 3,628,799 A | * | 12/1971 | Wiese | F16J 15/3416 277/401 |
| 3,638,957 A | * | 2/1972 | Marsi | F16J 15/3416 277/400 |
| 3,869,135 A | * | 3/1975 | Diederich | F04D 29/12 277/378 |
| 4,272,084 A | * | 6/1981 | Martinson | F16J 15/006 277/365 |

(Continued)

FOREIGN PATENT DOCUMENTS

| | | |
|---|---|---|
| EP | 0453179 | 10/1991 |
| EP | 2716943 | 4/2014 |
| WO | 0116510 | 3/2001 |

OTHER PUBLICATIONS

European Patent Office, European Search Report dated Nov. 26, 2018 in Application No. 18181977.2-1006.

*Primary Examiner* — Eugene G Byrd
(74) *Attorney, Agent, or Firm* — Snell & Wilmer, L.L.P.

(57) ABSTRACT

A gas turbine engine may include a liftoff carbon seal assembly. Liftoff carbon seal assembly may include a static seal support structure, a magnetic carrier spring assembly coupled to the static seal support structure, a nonferrous metal slab magnetically associated with the magnetic carrier spring assembly and coupled to the static seal support structure. In various embodiments, a combination of the magnetic carrier spring assembly and the nonferrous metal slab create a counter-force using an eddy current to oppose a motion of the magnetic carrier spring assembly.

20 Claims, 3 Drawing Sheets

(56) References Cited

U.S. PATENT DOCUMENTS

| | | | | |
|---|---|---|---|---|
| 4,406,963 A * | 9/1983 | Wolf | ................ | H02K 13/10 310/239 |
| 4,434,987 A * | 3/1984 | Albers | ................ | F16J 15/3444 277/317 |
| 4,447,063 A * | 5/1984 | Kotzur | ................ | F16J 15/342 277/304 |
| 4,477,088 A * | 10/1984 | Picard | ................ | F16J 15/008 277/379 |
| 4,586,719 A * | 5/1986 | Marsi | ................ | F04D 29/126 277/361 |
| 4,722,534 A * | 2/1988 | Wentworth | ................ | F16J 15/3464 277/306 |
| 4,887,395 A * | 12/1989 | Lebeck | ................ | F16J 15/3428 451/239 |
| 5,014,999 A * | 5/1991 | Makhobey | ................ | F01D 11/003 277/422 |
| 5,078,411 A | 1/1992 | Geco | | |
| 5,090,712 A * | 2/1992 | Pecht | ................ | F16J 15/3412 277/400 |
| 5,137,284 A * | 8/1992 | Holder | ................ | F16J 15/3416 277/390 |
| 5,201,531 A * | 4/1993 | Lai | ................ | F16J 15/3412 277/400 |
| 5,324,048 A * | 6/1994 | Carmody | ................ | F16J 15/3496 277/367 |
| 5,368,314 A * | 11/1994 | Victor | ................ | F16J 15/3412 277/400 |
| 5,443,274 A * | 8/1995 | Fuse | ................ | F16J 15/3468 277/390 |
| 5,454,572 A * | 10/1995 | Pospisil | ................ | F16J 15/004 277/368 |
| 5,498,007 A * | 3/1996 | Kulkarni | ................ | F16J 15/3412 277/366 |
| 5,521,448 A * | 5/1996 | Tecza | ................ | F16C 27/06 310/51 |
| 5,606,475 A * | 2/1997 | Ishizuka | ................ | G11B 17/0282 310/90 |
| 5,702,110 A * | 12/1997 | Sedy | ................ | F16J 15/3412 277/400 |
| 5,709,527 A | 1/1998 | Ernst et al. | | |
| 5,901,965 A * | 5/1999 | Ringer | ................ | F16J 15/363 277/361 |
| 5,947,481 A * | 9/1999 | Young | ................ | F16J 15/3428 277/399 |
| 6,220,602 B1 | 4/2001 | Webster et al. | | |
| 6,311,983 B1 * | 11/2001 | Burcham | ................ | F16J 15/002 277/370 |
| 6,364,605 B1 * | 4/2002 | Lutes | ................ | F04D 5/002 277/370 |
| 6,446,976 B1 * | 9/2002 | Key | ................ | F16J 15/3416 277/367 |
| 6,747,383 B2 * | 6/2004 | Tornquist | ................ | F16C 25/08 310/156.16 |
| 6,848,689 B2 * | 2/2005 | Auber | ................ | F16J 15/3464 277/358 |
| 7,175,388 B2 * | 2/2007 | Labbe | ................ | F01D 11/003 415/174.5 |
| 7,240,904 B2 * | 7/2007 | Droscher | ................ | F16J 15/3464 277/349 |
| 7,438,519 B2 * | 10/2008 | Torres-Reyes | ................ | F04D 29/106 415/126 |
| 7,819,405 B2 * | 10/2010 | Ohama | ................ | F16J 15/3404 277/370 |
| 8,201,830 B2 * | 6/2012 | Nobrega | ................ | F16J 15/348 277/345 |
| 8,777,229 B2 * | 7/2014 | Davis | ................ | F01D 11/005 277/390 |
| 9,255,495 B2 | 2/2016 | Griffin | | |
| 9,657,744 B2 | 5/2017 | Gilarranz et al. | | |
| 2006/0103074 A1 * | 5/2006 | Droscher | ................ | F16J 15/3464 277/370 |
| 2008/0042364 A1 * | 2/2008 | Zheng | ................ | F16J 15/3444 277/378 |
| 2010/0164180 A1 * | 7/2010 | Short | ................ | F01D 11/003 277/370 |
| 2012/0321439 A1 | 12/2012 | Maier | | |
| 2016/0053691 A1 * | 2/2016 | Ernst | ................ | F02C 3/107 415/121.3 |
| 2017/0045144 A1 * | 2/2017 | Khaira | ................ | F16J 15/3444 |

* cited by examiner

EDDY CURRENT DAMPER FOR LIFT OFF SEAL

FIELD

The present disclosure is directed to a gas turbine engine. More particularly, to a liftoff carbon seal assembly and a method of mitigating destabilizing aero forces using eddy current damping in liftoff seals for a gas turbine engine.

BACKGROUND

Gas turbine engines include a compressor section, a turbine section, and a combustor section. Many gas turbine engines also include a liftoff seal to prevent leakage (or flow) from one compartment to another compartment. The vibratory response of a liftoff seal may cause damage to the carbon seal. The fluid film formed between the carbon seal and the seal plate can produce negative damping under certain operating conditions, which can overcome the positive mechanical damping present in the system. When negative damping occurs, the carbon seal can impact the seal plate, causing carbon seal wear and damage. A typical approach for adding damping is to use a sheet metal damper on the bellows, which may not always damp the modes of interest that result in large carrier motion.

SUMMARY

Disclosed herein in various embodiments, a gas turbine engine having a liftoff carbon seal assembly. In various embodiments, gas turbine engine may include a liftoff carbon seal assembly. Liftoff carbon seal assembly may include a static seal support structure, a magnetic carrier spring assembly coupled to the static seal support structure, a nonferrous metal slab magnetically associated with the magnetic carrier spring assembly and coupled to the static seal support structure. In various embodiments, a combination of the magnetic carrier spring assembly and the nonferrous metal slab create a counter-force using an eddy current to oppose a motion of the magnetic carrier spring assembly.

In various embodiments of gas turbine engine, the magnetic carrier spring assembly includes a spring, a carrier, a magnet, and a seal, wherein the spring is coupled to the carrier and the carrier is coupled to the magnet and the seal. In various embodiments of gas turbine engine, the nonferrous metal slab may be magnetically associated with a magnet of the magnetic carrier spring assembly.

In various embodiments of gas turbine engine, the magnetic carrier spring assembly is put in axial motion toward the nonferrous metal slab by a spring. In various embodiments of gas turbine engine, magnet of the magnetic carrier spring assembly is put in motion towards the nonferrous metal slab by an unbalance of a spring force and a hydrodynamic force. In various embodiments of gas turbine engine, the counter-force is created by a magnet of the magnetic carrier spring assembly being put in motion towards the nonferrous metal slab.

In various embodiments of gas turbine engine, the nonferrous metal slab is adjacent to the static seal support structure. In various embodiments of gas turbine engine, the nonferrous metal slab is at least one of aluminum, copper, titanium, or non-magnetic stainless steel. In various embodiments of gas turbine engine, the magnet is a permanent magnet. In various embodiments of gas turbine engine, the magnet and the non-rotating carbon seal are adjacent to the carrier.

In various embodiments, a method for countering negative damping in a liftoff carbon seal assembly includes generating a first magnetic field in the liftoff carbon seal assembly 104 with a magnet located in a magnetic carrier spring assembly, putting the magnetic carrier spring assembly in motion relative to a nonferrous metal slab coupled to the liftoff carbon seal assembly to generate an eddy current in the nonferrous metal slab, using a second magnetic field created by the eddy current in the nonferrous metal slab in combination with the first magnetic field of the magnet to create a counter-force, and using the counter-force to magnetically counter the motion of the magnetic carrier spring assembly.

In various embodiments of the method for countering negative damping, the magnetic carrier spring assembly is put in axial motion towards the nonferrous metal slab. In various embodiments of the method for countering negative damping, the method further includes generating the counter-force while the magnet is in motion. In various embodiments of the method for countering negative damping, the nonferrous metal slab abuts a static seal support structure. In various embodiments of the method for countering negative damping, the magnet is a permanent magnet and the nonferrous metal slab is at least one of aluminum, copper, titanium, or non-magnetic stainless steel. In various embodiments of the method for countering negative damping, the method further includes using the magnet to control the amount of counter-force created by the first magnetic field and the second magnetic field.

In various embodiments, a liftoff carbon seal assembly includes a rotating seal plate, a non-rotating carbon seal hydrodynamically adjacent to the rotating seal plate, a carrier adjacent to the non-rotating carbon seal and a magnet, and a nonferrous metal slab magnetically associated with the magnet, wherein the combination of the magnet with the nonferrous metal slab creates a counter-force to counter a motion of a spring coupled to the carrier.

In various embodiments of the liftoff carbon seal assembly, the magnet is a permanent magnet. In various embodiments of the liftoff carbon seal assembly, the nonferrous metal slab is aluminum, copper, titanium, or non-magnetic stainless steel. In various embodiments of the liftoff carbon seal assembly, the non-rotating carbon seal, the carrier, and the spring are supported by a static seal support structure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Figure 1:
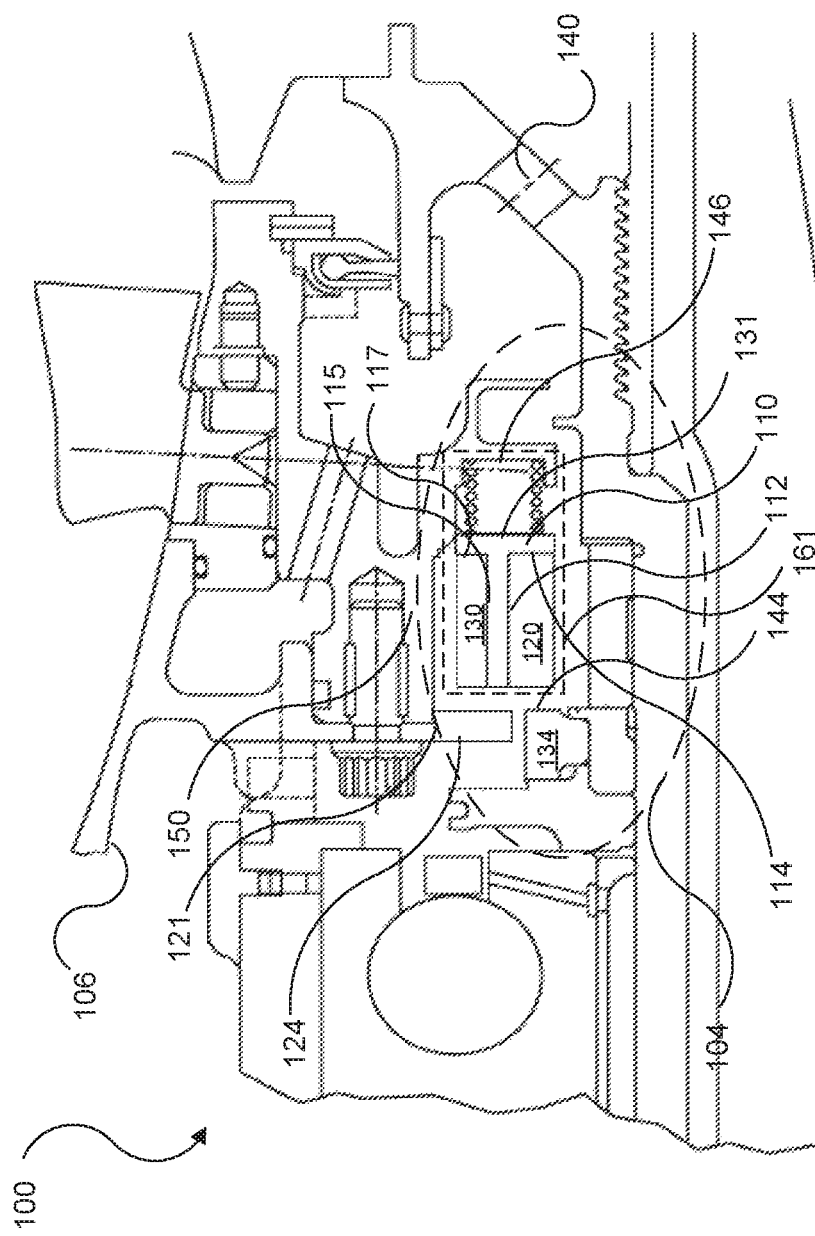
FIG. 1 is a cross-sectional view of a liftoff carbon seal assembly in a gas turbine engine, in accordance with various embodiments.

FIG. 1 illustrates a schematic view of a gas turbine engine 100. While a two spool high bypass turbofan engine is schematically illustrated in various embodiments, it should be understood that the disclosure is applicable to other gas turbine engine configurations, including, for example, gas turbines for power generation, turbojet engines, low bypass turbofan engines, turboshaft engines, etc.

In various embodiments, gas turbine engine 100 includes a liftoff carbon seal assembly 104 located between a static structure 106 and a rotational structure 140. Static structure 106 may be, for example, an intermediate case, and rotational structure may be, for example, a high pressure compressor shaft.

In various embodiments, liftoff carbon seal assembly 104 may include a magnetic carrier spring assembly 161, a seal plate 134, a static seal support structure 150, and a nonferrous metal slab 124. Magnetic carrier spring assembly 161 may include a seal carrier 110, a non-rotating carbon seal 120, a magnet 130, and a spring assembly 146.

In various embodiments non-rotating carbon seal 120 may be, for example, a liftoff seal, and more particularly, a carbon seal liftoff seal. In various embodiments, nonferrous metal slab 124 may be a substantially nonferrous metal such as, for example, aluminum, copper, titanium, non-magnetic stainless steel, or other metals that contain limited amounts of iron and/or have non-magnetic properties. Static seal support structure 150 may be mounted to static structure 106 with fasteners. In various embodiments, various mount arrangements may additionally be provided about the diameter of liftoff carbon seal assembly 104. Static seal support structure 150 may, for example, be used to retain liftoff carbon seal assembly 104.

In various embodiments, non-rotating carbon seal 120 interfaces with seal carrier 110 at interface 112 and interface 114. Magnet 130 interfaces with seal carrier 110 at interface 115 and interface 117. Seal carrier 110 interfaces with spring assembly 146 at interface 131. Nonferrous metal slab 124 interfaces with static seal support structure 150 at interface 121. In various embodiments, the aforementioned interfaces provide locations where the corresponding elements may be directly or indirectly coupled together.

In various embodiments, during operation of gas turbine engine 100, rotational structure 160 rotates and seal plate 134 rotates in unison with the rotational structure 140. Spring assembly 146 axially biases seal carrier 110 toward nonferrous metal slab 124. As a result, magnetic carrier spring assembly 161, which includes carrier 110, non-rotating carbon seal 120, spring assembly 146, and magnet 130, are placed in motion towards nonferrous metal slab 124. A hydrodynamic film typical of a liftoff seal occurs at interface 144 of non-rotating carbon seal 120 and seal plate 134.

In various embodiments, liftoff carbon assembly 104 of gas turbine engine 100 utilizes the physical principal of eddy current generation to create an eddy current in nonferrous metal slab 124 and an associated magnetic field to counter the effects of the vibratory response of liftoff carbon assembly 104. During operation of liftoff carbon assembly 104, magnetic carrier spring assembly 161 may be placed in motion by spring assembly 146 towards nonferrous metal slab 124. Due to the motion of magnet 130, which is affixed to carrier 110 of magnetic carrier spring assembly 161, a magnetic field associated with magnet 130 interacts with nonferrous metal slab 124, thereby creating an associated eddy current in nonferrous metal slab 124. In various embodiments, magnet 130 may be associated with nonferrous metal slab 124, which may be in motion due to non-rotating carbon seal 120 being axially biased. As is the case in typical eddy current systems, the eddy current in nonferrous metal 124 generates a corresponding magnetic field. The magnetic field of the nonferrous metal slab 124, in combination with the magnetic field of magnet 130, creates a force (i.e., a counter-force) that opposes the motion and/or velocity of magnetic carrier spring assembly 161. In various embodiments, magnet 130 that is magnetically associated with nonferrous metal slab 124, creates a force that counters the effect of negative damping, e.g., axial oscillation of a spring (depicted in FIGS. 2 and 3) in spring assembly 146 of liftoff carbon seal assembly 104.

Figure 2:
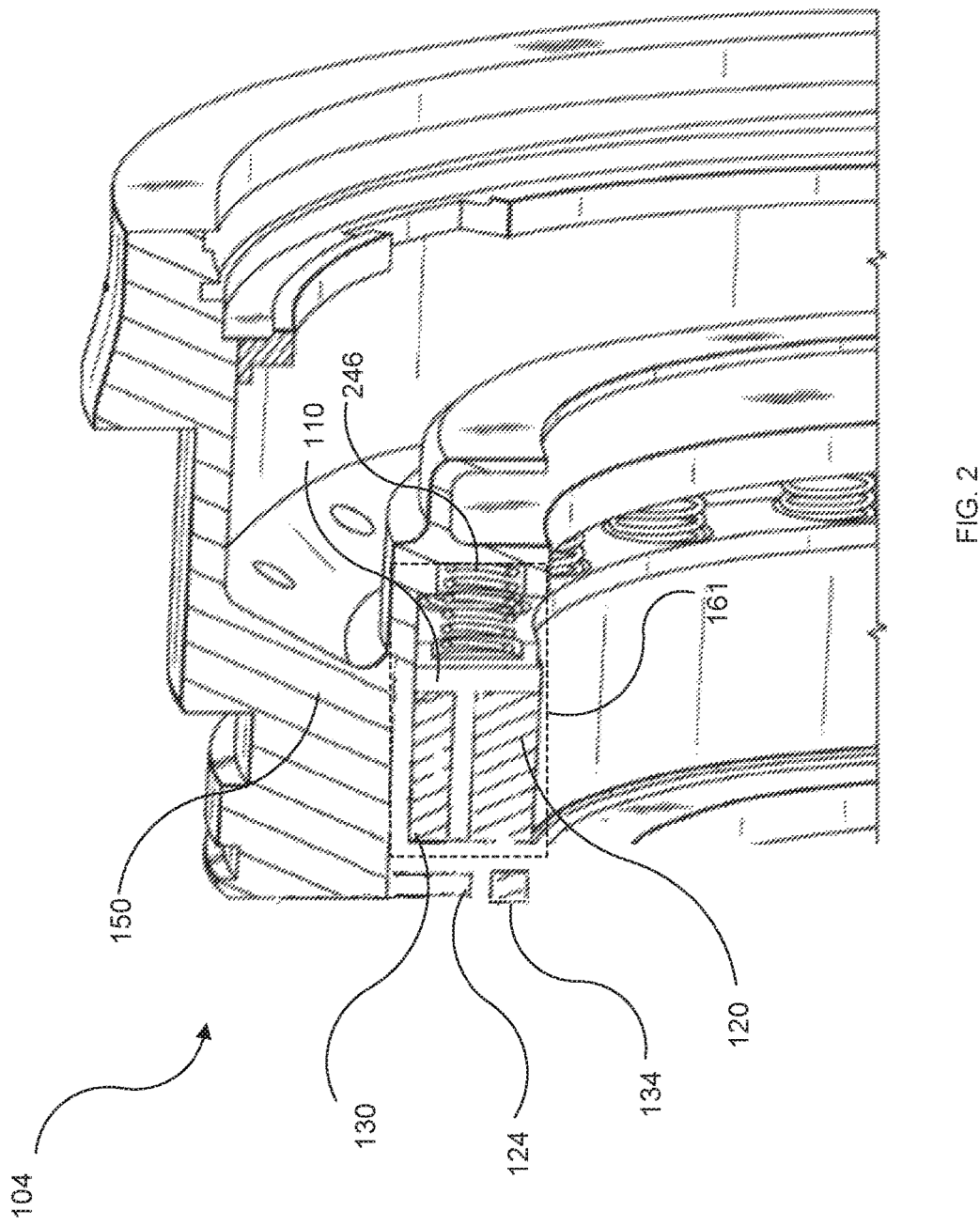
FIG. 2 is a perspective cross-sectional view of a liftoff carbon seal assembly, in accordance with various embodiments.

With reference to FIG. 2, a liftoff carbon seal assembly 104 of gas turbine engine 100 is depicted. In various embodiments, liftoff carbon seal assembly 104 may include at least one of a plurality of tabs to position magnet 130. The addition of the tabs may, for example, allow for better positioning of the at least one of magnet 130. In various embodiments, for example, there may be four tabs placed on non-rotating carbon seal 120. In various embodiments, there may be a greater number or lesser number of tabs depending on the number of magnets 130.

In various embodiments, spring 246 of magnetic carrier spring assembly 161 liftoff carbon seal assembly 104 may compel the motion of magnet 130 that causes an eddy current to flow in nonferrous metal slab 124. In various embodiments, spring 246 may compel the motion of seal carrier 110, non-rotating carbon seal 120, and magnet 130 towards nonferrous metal slab 124 causing the magnetic field associated with magnet 130 to create the eddy current in nonferrous metal slab 124. In various embodiments, the magnetic field created by the eddy current in nonferrous metal slab 124 in combination with the magnetic field of magnet 130 create a counter-force to counter a spring force created by spring 246.

In various embodiments, the combination of magnet 130 and nonferrous metal 124 reduces the vibratory response of non-rotating carbon seal 120, thereby reducing damage to non-rotating carbon seal 120. In various embodiments, the creation of the magnetic field associated with magnet 130 and the magnetic field associated with nonferrous metal slab 124 generate the counterforce, which thus acts to damp the axial oscillation of spring 246 and reduce the vibratory response of non-contact seal 220, thereby reducing damage to non-contact seal 220.

Figure 3:
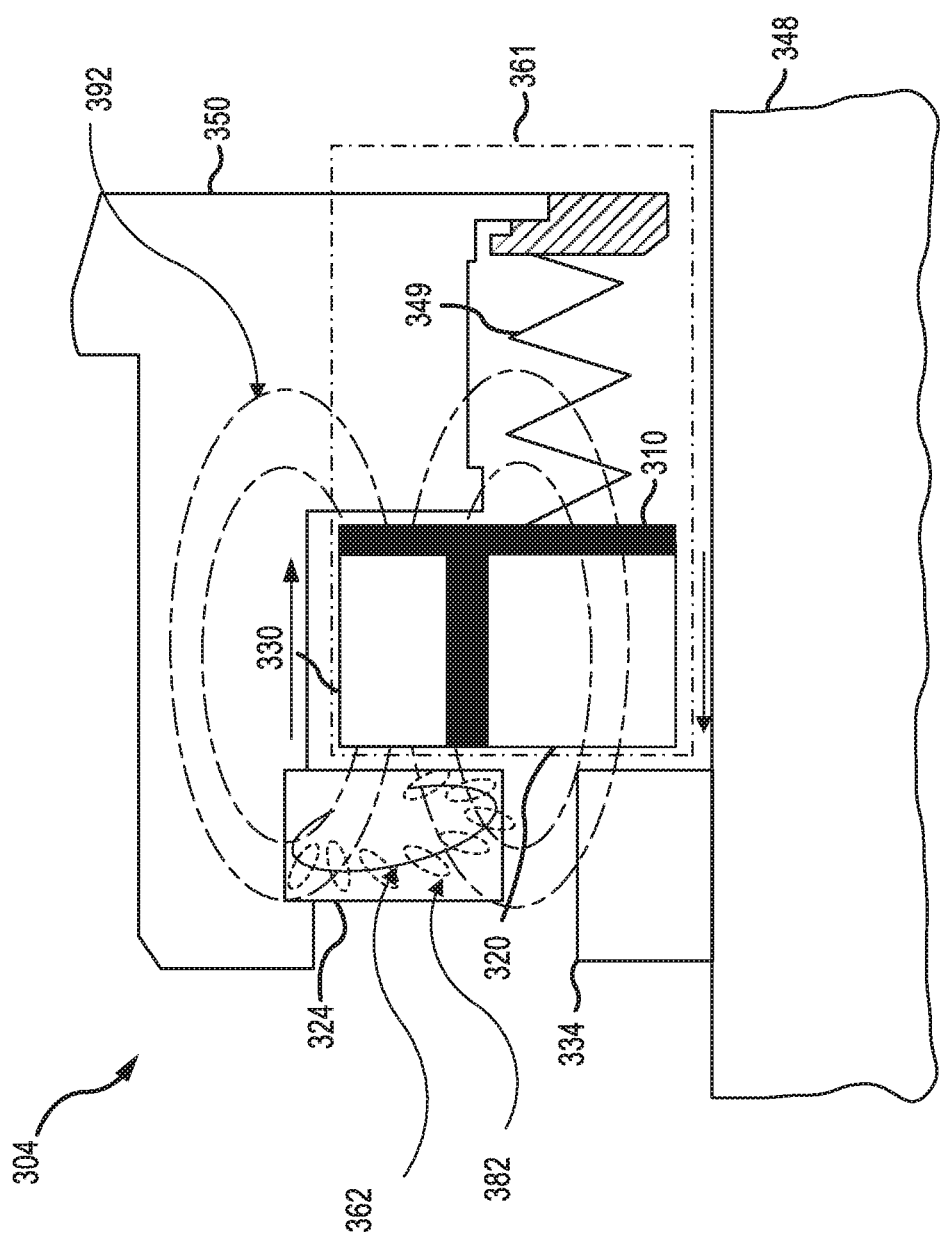
FIG. 3 is a perspective cross-sectional view of a liftoff carbon seal assembly showing magnetic fields, in accordance with various embodiments.

With reference to FIG. 3, liftoff carbon seal assembly 304 is illustrated according to various embodiments. In various embodiments, liftoff carbon seal assembly 304 may include a magnetic carrier spring assembly 361, a seal plate 334, a static seal support structure 350, and a nonferrous metal slab 324. Magnetic carrier spring assembly 361 may include a seal carrier 310, a non-rotating carbon seal 320, a magnet 330, and a spring 349.

In various embodiments, seal plate 334 is coupled to shaft 348, which rotates in unison with shaft 348. Spring 349 moves in unison with seal carrier 310, non-rotating carbon seal 320, and magnet 330 towards nonferrous metal slab 324 causing magnetic field 392 of magnet 330 to create eddy current 362 in nonferrous metal slab 324. The magnetic field 382 created by eddy current 362 in nonferrous metal slab 324 in combination with magnetic field 392 of magnet 330 create a counter-force to counter the motion and/or velocity of spring 349. In various embodiments, static seal support structure 350 and/or seal carrier 310 may, depending on the amount of counter-force required, be designed and/or manufactured with a material that allows the amount of countering force created by magnetic fields 382 and 392 to be controlled and/or permeate more freely.

In various embodiments, gas turbine engine 100 may include liftoff carbon seal assembly 104. Liftoff carbon seal assembly 104 may include static seal support structure 350, magnetic carrier spring assembly 361 coupled to static seal support structure 350, nonferrous metal slab 324 magnetically associated with the magnetic carrier spring assembly 361 and coupled to static seal support structure 350. In various embodiments, a combination of magnetic carrier spring assembly 361 and nonferrous metal slab 324 create a counter-force using an eddy current to oppose a motion of magnetic carrier spring assembly 361.

In various embodiments of gas turbine engine 100, magnetic carrier spring assembly 361 may include spring 349, carrier 310, magnet 330, and seal 320, wherein spring 349 is coupled to the carrier 310 and carrier 310 is coupled to magnet 330 and seal 320. In various embodiments of gas turbine engine 100, nonferrous metal slab 324 may be magnetically associated with magnet 330 of magnetic carrier spring assembly 361. In various embodiments of gas turbine engine 100, magnetic carrier spring assembly 361 may be put in axial motion toward the nonferrous metal slab 324 by a spring 349. In various embodiments of gas turbine engine 100, magnet 330 of magnetic carrier spring assembly 361 may be put in motion towards the nonferrous metal slab 324 by an unbalance of a spring force and a hydrodynamic force.

In various embodiments of gas turbine engine 100, the counter-force may be created by magnet 330 of magnetic carrier spring assembly 361 being put in motion towards nonferrous metal slab 324. In various embodiments of gas turbine engine 100, nonferrous metal slab 324 is adjacent to static seal support structure. In various embodiments of gas turbine engine 100, nonferrous metal slab 324 is at least one of aluminum, copper, titanium, or non-magnetic stainless steel. In various embodiments of gas turbine engine 100, magnet 330 is a permanent magnet. In various embodiments of gas turbine engine 100, magnet 330 and non-rotating carbon seal 320 may be adjacent to carrier 310.

With reference to FIG. 3 according to various embodiments, a method for countering negative damping in a liftoff carbon seal assembly 104 includes generating a first magnetic field 392 in the liftoff carbon seal assembly 104 with a magnet 330 located in a magnetic carrier spring assembly 361, putting the magnetic carrier spring assembly 361 in motion relative to a nonferrous metal slab 324 coupled to the liftoff carbon seal assembly 104 to generate an eddy current 362 in the nonferrous metal slab 324, using a second magnetic field 382 created by the eddy current 362 in the nonferrous metal slab 324 in combination with the first magnetic field 392 of the magnet 330 to create a counter-force, and using the counter-force to magnetically counter the motion of the magnetic carrier spring assembly 361.

In further reference to FIG. 3, in various embodiments of the method for countering negative damping, the magnetic carrier spring assembly 361 is put in axial motion towards nonferrous metal slab 324. In various embodiments of the method for countering negative damping, the method further includes generating the counter-force while magnet 330 is in motion. In various embodiments of the method for countering negative damping, nonferrous metal slab 324 abuts a static seal support structure 350. In various embodiments of the method for countering negative damping, magnet 330 is a permanent magnet and nonferrous metal slab 324 is at least one of aluminum, copper, titanium, or non-magnetic stainless steel. In various embodiments of the method for countering negative damping, the method further includes using magnet 330 to control the amount of counter-force created by first magnetic field 392 and second magnetic field 382.

With reference to FIG. 3 according to various embodiments, a liftoff carbon seal assembly 304 includes rotating seal plate 334, non-rotating carbon seal 320 hydrodynamically adjacent to rotating seal plate 334, carrier 310 adjacent to non-rotating carbon seal 320 and magnet 330, and nonferrous metal slab 324 magnetically associated with the magnet 330. In various embodiments, the combination of the magnet 330 with the nonferrous metal slab 324 creates a counter-force to counter a motion of a spring 349 coupled to the carrier 310. In various embodiments of the liftoff carbon seal assembly 304, magnet 330 is a permanent magnet. In various embodiments of liftoff carbon seal assembly 304, nonferrous metal slab 324 is aluminum, copper, titanium, or non-magnetic stainless steel. In various embodiments of the liftoff carbon seal assembly 304, non-rotating carbon seal 320, carrier 310, and spring 349 are supported by static seal support structure 350.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gas turbine engine having a liftoff carbon seal assembly comprising:
   a static seal support structure;
   a magnetic carrier spring assembly coupled to said static seal support structure;
   a magnet located in the magnetic carrier spring assembly;
   a nonferrous nonmagnetic metal slab coupled to said static seal support structure, wherein said nonferrous nonmagnetic metal slab abuts said static seal support structure, and wherein a combination of said magnet and said nonferrous nonmagnetic metal slab create a counter-force using an eddy current created in said nonferrous nonmagnetic metal slab by said magnet to oppose a motion of said magnetic carrier spring assembly.

2. The gas turbine engine of claim 1, wherein said magnetic carrier spring assembly includes a spring, a carrier, said magnet, and a seal, wherein said spring is coupled to said carrier and said carrier is coupled to said magnet and said seal.

3. The gas turbine engine of claim 1, wherein a first magnetic field generated by said magnet creates said eddy current in said nonferrous nonmagnetic metal slab, and wherein said first magnetic field in combination with a second magnetic field created by said eddy current in said nonferrous nonmagnetic metal slab create said counter-force.

4. The gas turbine engine of claim 1, wherein said magnetic carrier spring assembly is put in axial motion toward said nonferrous nonmagnetic metal slab by a spring.

5. The gas turbine engine of claim 1, wherein said magnet is put in motion towards said nonferrous nonmagnetic metal slab by an unbalance of a spring force and a hydrodynamic force.

6. The gas turbine engine of claim 1, wherein said counter-force is created by said magnet being put in motion towards said nonferrous nonmagnetic metal slab.

7. The gas turbine engine of claim 1, wherein said nonferrous nonmagnetic metal slab is at least one of aluminum, copper, titanium, or non-magnetic stainless steel.

8. The gas turbine engine of claim 1, wherein said magnet is a permanent magnet.

9. The gas turbine engine of claim 2, wherein said magnet and said seal are adjacent to said carrier.

10. A method for countering negative damping in a liftoff carbon seal assembly, the method comprising:
    generating a first magnetic field in said liftoff carbon seal assembly with a magnet located in a magnetic carrier spring assembly, said magnetic carrier spring assembly including a spring, a carrier, said magnet, and a non-rotating seal;
    putting said magnetic carrier spring assembly in motion relative to a nonferrous nonmagnetic metal slab coupled to said liftoff carbon seal assembly to generate an eddy current in said nonferrous nonmagnetic metal slab, wherein said nonferrous nonmagnetic metal slab is coupled to a static seal support structure;
    using a second magnetic field created by said eddy current in said nonferrous nonmagnetic metal slab in combination with said first magnetic field of said magnet to create a counter-force; and
    using said counter-force to magnetically counter said motion of said magnetic carrier spring assembly.

11. The method of claim 10, wherein said magnetic carrier spring assembly is put in axial motion towards said nonferrous nonmagnetic metal slab.

12. The method of claim 10, further comprising generating said counter-force while said magnet is in motion.

13. The method of claim 10, wherein said nonferrous nonmagnetic metal slab abuts said static seal support structure.

14. The method of claim 10, wherein said magnet is a permanent magnet and said nonferrous nonmagnetic metal slab is at least one of aluminum, copper, titanium, or non-magnetic stainless steel.

15. The method of claim 10, further comprising using said magnet to control the amount of counter-force created by said first magnetic field and said second magnetic field.

16. A liftoff carbon seal assembly comprising:
- a rotating seal plate;
- a non-rotating carbon seal hydrodynamically adjacent to said rotating seal plate;
- a carrier adjacent to said non-rotating carbon seal;
- a magnet coupled said carrier; and
- a nonferrous nonmagnetic metal slab magnetically associated with said magnet, wherein said nonferrous nonmagnetic metal slab comprises a static structure, and wherein a combination of said magnet with said nonferrous nonmagnetic metal slab creates a counter-force to counter a motion of said carrier towards said nonferrous nonmagnetic metal slab.

17. The liftoff carbon seal assembly of claim 16, wherein said magnet is a permanent magnet.

18. The liftoff carbon seal assembly of claim 16, wherein said nonferrous nonmagnetic metal slab is aluminum, copper, titanium, or non-magnetic stainless steel.

19. The liftoff carbon seal assembly of claim 16, further comprising a spring configured to bias said carrier towards said nonferrous nonmagnetic metal slab, wherein said non-rotating carbon seal, said carrier, and said spring are supported by a static seal support structure.

20. The liftoff carbon seal assembly of claim 19, wherein said nonferrous nonmagnetic metal slab is coupled to said static seal support structure.

\* \* \* \* \*